Patented July 13, 1954

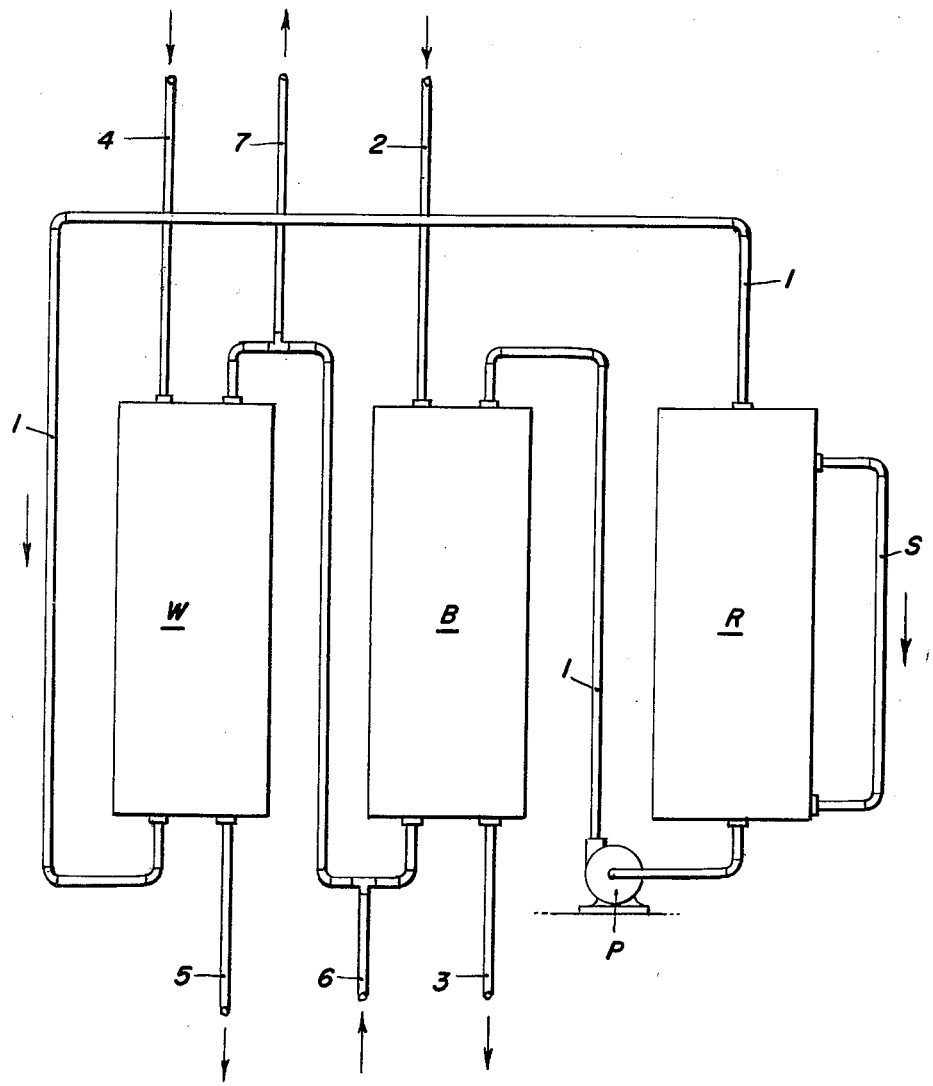

2,683,734

UNITED STATES PATENT OFFICE 2,683,734

METHOD OF CONCENTRATING GASEOUS HYDROCYANIC ACID AND THE USE OF THE METHOD IN THE MANUFACTURE OF ACRYLONITRILE

Daniel Porret, Monthey, Switzerland, assignor to Ciba Limited, Basel, Switzerland, a Swiss firm Application August 29, 1951, Serial No. 244,185

Claims priority, application Switzerland September 11, 1950

4 Claims. (Cl. 260—465.3)

In many chemical processes, in which hydrocyanic acid is required, the latter must be used in the form of a concentrated aqueous solution or in an anhydrous liquid or concentrated gaseous form. Since hydrocyanic acid as obtained in commerically important processes for its manufacture is not obtained directly in a concentrated form, but in dilute form in a gaseous mixture, it must be concentrated before use. A known method of concentration is to pass such a gaseous mixture containing hydrocyanic acid, for example, through alkali or alkaline earth metal liquors in order to absorb the hydrocyanic acid with the formation of alkali cyanides or alkaline earth metal cyanides. The corresponding metal cyanides are recovered in solid form from the cyanide solutions. If, however, free hydrocyanic acid is required it must be liberated from the concentrated cyanide solution by the addition of a mineral acid. Such concentration obviously increases the cost of the hydrocyanic acid.

The concentrating of hydrocyanic acid from gases containing hydrocyanic acid can also be carried out by strongly cooling the gaseous mixture, so that the hydrocyanic acid separates directly in liquid form. However, this method can only be used economically when the gaseous mixture contains considerable amounts of hydrocyanic acid. This method is not economical in the case of gaseous mixtures having a low content of hydrocyanic acid. It has also been proposed to absorb in water the hydrocyanic acid from gaseous mixtures poor in hydrocyanic acid, and to recover the hydrocyanic acid in concentrated form by boiling the resulting solution, if desired under reduced pressure. This process has not been found suitable for recovering concentrated hydrocyanic acid from dilute solutions, which contain, for example, only 0.3 to 0.5 per cent. by weight of hydrocyanic acid, one reason being that in this range of concentrations a large percentage of the hydrocyanic acid cannot be recovered and another reason being that the expenditure of energy required is disproportionately large. For these reasons this method has not found commercial application, and for obtaining concentrated hydrocyanic acid from gaseous mixtures poor in hydrocyanic acid it has hitherto been necessary to use the expensive method involving the formation of metal cyanides.

The present invention is based on the observation that enriched gaseous hydrocyanic acid can be obtained from gaseous mixtures poor in hydrocyanic acid in a simple and inexpensive manner by passing the gaseous mixture through water to produce a dilute aqueous solution of hydrocyanic acid, and then expelling the hydrocyanic acid from the solution by intimate contact with an inert gas at a raised temperature, the temperature and quantity of the inert gas being so chosen that the resulting gas is enriched with hydrocyanic acid as compared with the gaseous mixture used as starting material.

In order to produce the dilute aqueous solution of hydrocyanic acid there may be used any gas containing a small amount of hydrocyanic acid. There come into consideration principally gaseous mixtures such as are obtained directly in the manufacture of hydrocyanic acid in the gaseous phase, when necessary, after removing harmful constituents. There is suitable, for example, the gaseous mixture which is obtained in the synthesis of hydrocyanic acid in an electric arc by the method of Andriessens (British Patent No. 296,355). Such a gas contains about 0.5 to 3.0 per cent. by volume of hydrocyanic acid, the greater part of which can be absorbed by water. If the gas used as starting material contains other compounds capable of absorption in water, if desired under pressure, they may be absorbed simultaneously with the hydrocyanic acid. Thus, for example, if such a gaseous mixture also contains acetylene the absorption of the hydrocyanic acid and of the acetylene can be carried out simultaneously, by carrying out the absorption under pressure in the manner known for absorbing acetylene. The gaseous mixture containing hydrocyanic acid may be passed through water at ordinary temperature, i. e. at about 20–25° C., but preferably at a lower temperature, for example, a temperature ranging from 0° C. to 5° C. When, for example, the gaseous mixture used as starting material contains about 0.5 to 1.5 per cent. of hydrocyanic acid there are obtained aqueous solutions containing about 3–7 grams of hydrocyanic acid per liter, that is to say very dilute solutions.

As the inert gas used for expelling the hydrocyanic acid from the aqueous solution there are to be understood gases which do not react with hydrocyanic acid under the conditions used. There is suitable, for example, nitrogen, hydrogen, carbon dioxide or a mixture of these gases. If the hydrocyanic acid obtained in concentrated form is to be used for the manufacture of acrylonitrile, it is of special advantage to use acetylene as the inert gas.

The hydrocyanic acid is advantageously expelled by bringing the aqueous hydrocyanic acid solution into intimate contact with the inert gas at a raised temperature, that is to say a temperature above that at which the absorption of the hydrocyanic acid was carried out, for example, a temperature ranging from about 40° C. to about 90° C., and preferably 60-70° C. The inert gas is capable of expelling the hydrocyanic acid from the dilute aqueous solution practically completely. Unnecessary dilution of the expelled gaseous hydrocyanic acid should be as far as possible avoided. Obviously, therefore, there shoud be used only the quantity of inert gas necessary for expelling the hydrocyanic acid under the prevailing conditions. The more thorough is the inter-mixing of the inert gas with the hydrocyanic acid solution the smaller is the quantity of inert gas required, in order to expel a given quantity of hydrocyanic acid at a given temperature. An advantageous procedure is to cause the hydrocyanic acid solution to trickle downwardly through a reaction vessel filled with filling bodies, for example, Berl's saddle-shaped bodies, Raschig rings or the like, and to pass the inert gas in counter-current upwardly through the vessel. It is of advantage so to choose the conditions that the quantity of inert gas required to expel the hydrocyanic acid does not exceed one half of the quantity of the gaseous mixture used as starting material. For example, if the starting solution contains 3-7 grams of hydrocyanic acid per liter, as stated above, the hydrocyanic acid can be removed quantitatively from the solution by using, for example, acetylene as the inert gas at 70° C., and a gaseous mixture containing about 5-10 per cent. of hydrocyanic acid is obtained. This gaseous mixture has a percentage content of hydrocyanic acid approximately 5-20 times greater than that of the gaseous mixture used as starting material. Such an enriched gaseous mixture can be used directly for many reactions. Moreover, the hydrocyanic acid can easily be separated from such a gas in liquid form or converted into a concentrated aqueous solution by absorption in water.

The present method constitutes a valuable technical advance because it enables hydrocyanic acid from gaseous mixtures poor in hydrocyanic acid to be concentrated without the use of chemical reactions, and therefore is very economical owing to the saving of chemicals.

The invention is also based on the observation that the above method of concentrating hydrocyanic acid is especially suitable in the synthesis of acrylonitrile from hydrocyanic acid and acetylene.

It is known that acrylonitrile can be made by reacting together acetylene and hydrocyanic acid in the presence of an aqueous cuprous salt catalyst according to the equation $$CH\equiv CH+HCN\rightarrow CH_2=CH-CN$$

The reaction is advantageously conducted at about 80-100° C. The known process may be carried out in a discontinuous or continuous manner.

Among the cuprous salt catalysts hitherto used for the synthesis the so-called Nieuwland catalyst has been found to be especially suitable. This catalyst is most frequently used in the form of a mixture of 45.4 parts of cuprous chloride, 24.5 parts of ammonium chloride, 2.4 parts of concentrated hydrochloric acid and 42 parts of water, the parts being by weight. The ammonium chloride can however be replaced by an equivalent quantity of a mixture of potassium chloride 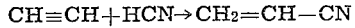 and sodium chloride, and instead of hydrochloric acid there may be used other strong acids, such as hydrobromic acid, sulfuric acid or phosphoric acid. Depending on the reaction conditions used the relative proportions of the components therein may vary within certain limits.

In this discontinuous process an aqueous cuprous chloride catalyst is charged at ordinary temperature with equivalent quantities of acetylene and hydrocyanic acid, both in concentrated form, and then the reaction mixture is heated at 70-100° C. In this way acrylonitrile is formed, and the latter is distilled together with water, unreacted hydrocyanic acid and acetylene. The yield of acrylonitrile in this process does not exceed about 30 per cent.

In the continuous process the catalyst mixture is heated in a reaction tower at 70-100° C., and acetylene is passed through the hot mixture and hydrocyanic acid is simultaneously introduced dropwise. The acrylonitrile formed is removed from the reaction tower by the current of acetylene, and is absorbed from the gas by dissolution in water or by condensation, and separated by fractional distillation, the excess of acetylene being returned to the reaction tower. The acetylene may in this process be diluted by the addition of an inert gas such as nitrogen.

In both processes the hydrocyanic acid has been used hitherto in the form of a concentrated aqueous solution or in an anhydrous liquid or concentrated gaseous form. However, this is inconvenient because, as already stated, in commercially important processes for making hydrocyanic acid the latter is not obtained directly in a concentrated form, but in dilute form in a gaseous mixture. The dilute hydrocyanic acid must therefore be concentrated by one of the known methods described above before it is used for the synthesis of acrylonitrile. If it is attempted to utilise the hydrocyanic acid in such gases containing small amounts thereof without previous concentration by way of an alkali or alkaline earth metal cyanide, by passing directly into the hot Nieuwland catalyst the gaseous mixture which is obtained, for example, in the synthesis of hydrocyanic acid in an electric arc by the method of Andriessens and containing about 0.5 to 3.0 per cent. by volume of hydrocyanic acid and about 2-12 per cent. by volume of acetylene, the yields of acrylonitrile are very unsatisfactory, probably owing to the high degree of dilution of the reaction components.

It has now been unexpectedly found that acrylonitrile can be obtained in good yield by the additive combination of hydrocyanic acid and acetylene in the presence of an aqueous cuprous salt catalyst, if the hydrocyanic acid and acetylene are used in the form of a gaseous mixture which has been obtained by passing a gas consisting of or containing acetylene through an aqueous dilute solution of hydrocyanic acid at a raised temperature.

The process may be carried out discontinuously or preferably continuously.

As the source of hydrocyanic acid there may be used for the production of the dilute aqueous solution used as starting material any gas containing a small amount of hydrocyanic acid. There come into consideration principally gaseous mixtures such as are obtained directly in the manufacture in the gaseous phase of hydrocyanic acid when necessary after removing harmful constituents. There is suitable, for example, the gaseous mixture resulting from the synthesis of hydrocyanic acid in an electric arc by the method of Andriessens (British Patent No. 296,355). Such a gas contains about 0.5–3.0 per cent. by volume of hydrocyanic acid, the greater part of which can be absorbed by water. The production of the dilute aqueous solution of hydrocyanic acid required for the present process is carried out in a simple manner by passing the gaseous mixture containing hydrocyanic acid through water at a low temperature.

The acetylene required for the synthesis of acrylonitrile in accordance with the present process may be in a concentrated form or diluted with an inert gas such as nitrogen. There is also suitable acetylene produced in an electric arc, which is advantageously used in a purified and enriched form. When the process is carried out continuously, it is especially advantageous to use the acetylene being recirculated to expel the hydrocyanic acid. In order to obtain good yields in the continuous method of synthesizing acrylonitrile a certain ratio of the quantity of acetylene being recirculated, to the quantity of catalyst must be maintained. Preferably there are used, for example, 100 liters of circulating acetylene for each liter of catalyst. It has been unexpectedly found that the quantity of circulating acetylene advantageous for the synthetic suffices in order to expel from the dilute aqueous hydrocyanic acid solution at 60–70° C. such a quantity of hydrocyanic acid that a gaseous mixture can be supplied to the catalyst containing acetylene and hydrocyanic acid in a ratio suitable for the synthesis of acrylonitrile.

In other respects the synthesis of acrylonitrile may be carried out in known manner.

The present process leads to yields as good as those of the known processes, and this could not have been foreseen from prior knowledge. In the preferred known processes the catalyst is first continuously charged with hydrocyanic acid before it is brought into contact with acetylene, which is achieved by introducing the hydrocyanic acid and the acetylene separately. The reason given was that in this manner the formation of by-products could be reduced. In the present process however, the hydrocyanic acid and the acetylene are introduced simultaneously and at the same place into the catalyst, and it is surprising that the yield is not impaired. Only once at the beginning of a period of synthesis is the catalyst first charged with hydrocyanic acid.

Owing to the simple and inexpensive method of concentrating the hydrocyanic acid, the manufacture of acrylonitrile in accordance with the invention is considerably more economical than the known processes.

The present process, as compared with the known processes, also has the considerable advantage that the hydrocyanic acid is not present in the form of a concentrated aqueous solution or in liquid form, which makes it possible to work with safety.

The following examples illustrate the invention:

*Example 1*

A gaseous mixture which has been obtained in the synthesis of hydrocyanic acid in an electric arc by the process of Andriessens and which contains about 0.5–1.5 per cent. of hydrocyanic acid, is passed at 0–5° C. through water, and an aqueous hydrocyanic acid solution of 0.35 per cent. strength is obtained. The solution is allowed to trickle through a reaction tower having about 12–15 liters capacity containing filling bodies at 65–70° C. at the rate of 15 liters per hour. At the same time a current of nitrogen is passed upwardly through the tower in counter-current at the rate of 500–600 liters per hour. At the upper end of the reaction tower there is obtained a gaseous mixture which contains 8.8 per cent. by volume of hydrocyanic acid. This corresponds to 99.5 per cent. of the hydrocyanic acid introduced into the reaction tower. The water flowing from the lower end of the tower contains practically no hydrocyanic acid.

*Example 2*

The apparatus illustrated diagrammatically in the accompanying drawing is used for the synthesis of acrylonitrile. The apparatus consists in the main of a reaction tower R for the catalyst provided with a side branch pipe S, a tower B for recovering the hydrocyanic acid and a washing tower W for removing the acrylonitrile formed. The three towers are connected with one another by a pipe 1 for the circulating gas. Circulation is maintained by the pump P. The tower B also has a supply pipe 2 for the dilute aqueous hydrocyanic acid solution and an outlet pipe 3 for the degassed waste water. The tower W is provided with an inlet pipe 4 for the washing water and with an outlet pipe 5 for the dilute acrylonitrile solution. Fresh acetylene can be supplied to the system through the pipe 6, and a part of the acetylene contaminated with by-products can be removed through the pipe 7 as waste gas from the circulation system.

In order to begin a period of synthesis 5 liters of Nieuwland catalyst are charged into the reaction tower R having a corresponding capacity, and the catalyst is heated to about 80° C. Then nitrogen or carbon dioxide is passed through the acetylene circulation system 1 at the rate of 500 liters per hour whereby the catalyst in the reaction tower is subjected to thorough mixing. Then a hydrocyanic acid solution of 0.3 per cent. is trickled through the tower B heated at 70° C. at the rate of 22–25 liters per hour. The washing tower W is filled with water. During the first hour the hydrocyanic acid expelled in the tower B is completely absorbed by the catalyst in the tower R. Thereafter it can be detected in the water from the tower W. When this water contains about 0.6 per cent. of hydrocyanic acid, the nitrogen or the carbon dioxide is replaced by acetylene, and then the formation of acrylonitrile sets in immediately.

Under the conditions described above fresh acetylene must be introduced into the circulation system through the pipe 6 at the rate of about 80 liters per hour, while contaminated acetylene is removed from the system as waste gas through the pipe 7 at the rate of about 15 liters per hour. The acetylene contained in the waste gas can be reused after purification.

With the apparatus and under the conditions described above there are obtained about 100–120 grams of acrylonitrile per hour, which represents a yield of 75–80 per cent. calculated on the acetylene and 85–90 per cent. calculated on the hydrocyanic acid.

I claim:

1. In the manufacture of acrylonitrile by the additive combination of hydrocyanic acid and acetylene in the presence of an aqueous cuprous salt catalyst, the hydrocyanic acid and acetylene being in the form of a gaseous mixture, the modification which comprises passing, as starting material for the hydrocyanic acid, a gaseous mixture poor in hydrocyanic acid through water at a low temperature ranging from about 0° C. to about 20–25° C. to produce a dilute aqueous solution of hydrocyanic acid, contacting said solution at a temperature from about 40° to about 90° C. with a gas containing acetylene, said gas being the recirculated gas in the above manufacture of acrylonitrile, which gas expels the hydrocyanic acid from the solution, and introducing the gaseous mixture of acetylene and hydrocyanic acid thus obtained into the aqueous cuprous salt catalyst.

2. In the manufacture of acrylonitrile by the additive combination of hydrocyanic acid and acetylene in the presence of an aqueous cuprous salt catalyst, the hydrocyanic acid and acetylene being in the form of a gaseous mixture, the modification which comprises passing, as starting material for the hydrocyanic acid, a gaseous mixture poor in hydrocyanic acid and obtained in the manufacture of hydrocyanic acid in the gaseous phase, through water at 0–5° C. to produce a dilute aqueous solution of hydrocyanic acid, contacting said solution within the range of about 40° C. to about 90° C. with a gas containing acetylene, said gas being the recirculated gas in the above manufacture of acrylonitrile, which gas expels the hydrocyanic acid from the solution, and introducing the gaseous mixture of acetylene and hydrocyanic acid thus obtained into the aqueous cuprous salt catalyst.

3. In the manufacture of acrylonitrile by the additive combination of hydrocyanic acid and acetylene in the presence of an aqueous cuprous salt catalyst, the hydrocyanic acid and acetylene being in the form of a gaseous mixture, the modification which comprises passing, as starting material for the hydrocyanic acid, a gaseous mixture poor in hydrocyanic acid and obtained in the manufacture of hydrocyanic acid in an electric arc, through water at 0–5° C. to produce a dilute aqueous solution of hydrocyanic acid, contacting said solution within the range of about 40° C. to about 90° C. with a gas containing acetylene, said gas being the recirculated gas in the above manufacture of acrylonitrile, which gas expels the hydrocyanic acid from the solution, and introducing the gaseous mixture of acetylene and hydrocyanic acid thus obtained into the aqueous cuprous salt catalyst.

4. In the manufacture of acrylonitrile by the additive combination of hydrocyanic acid and acetylene in the presence of an aqueous cuprous salt catalyst, the hydrocyanic acid and acetylene being in the form of a gaseous mixture, the modification which comprises passing, as starting material for the hydrocyanic acid, a gaseous mixture containing about 0.5 to 1.5 per cent hydrocyanic acid and obtained in the manufacture of hydrocyanic acid in an electric arc, through water at 0–5° C. to produce a dilute aqueous solution containing about 0.3 per cent hydrocyanic acid, contacting said solution at 70° C. at a rate of 22–25 liters per hour with 500 liters per hour of a gas containing acetylene, said gas being the recirculated gas in the above manufacture of acrylonitrile, which gas expels the hydrocyanic acid from the solution, and introducing the gaseous mixture of acetylene and hydrocyanic acid thus obtained at about 80° C. into about 5 liters of Nieuwland catalyst, which consists of a mixture of 45.4 parts of cuprous chloride, 24.5 parts of ammonium chloride, 2.4 parts of concentrated hydrochloric acid and 42 parts of water, the parts being by weight.

References Cited in the file of this patent

UNITED STATES PATENTS

| Number | Name | Date |
|---|---|---|
| 1,605,897 | Liebknecht | Nov. 2, 1926 |
| 2,370,849 | Dutcher | Mar. 6, 1945 |
| 2,385,327 | Bradley et al. | Sept. 25, 1945 |
| 2,442,040 | Foster | May 25, 1948 |
| 2,486,659 | Kurtz | Nov. 1, 1949 |
| 2,502,678 | Spaulding | Apr. 4, 1950 |
| 2,521,233 | Latchum | Sept. 5, 1950 |
| 2,540,905 | Neubauer | Feb. 6, 1951 |

OTHER REFERENCES

Hasche et al.: Fiat Final Report No. 836, pages 4–5 (1946).

Nill et al.: Fiat Fnal Report No. 1125, pages 1–5 (1947).

Mathews: PB 47, 715 (BIOS), pages 1–2. Received April 7, 1948.